US011966175B2

(12) United States Patent
Yamashita

(10) Patent No.: US 11,966,175 B2
(45) Date of Patent: Apr. 23, 2024

(54) INTERMEDIATE TRANSFER BELT CLEANING SYSTEM, TRANSFER DEVICE, AND IMAGE FORMING APPARATUS

(71) Applicant: FUJIFILM Business Innovation Corp., Tokyo (JP)

(72) Inventor: Yoshiro Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,111

(22) Filed: Mar. 26, 2023

(65) Prior Publication Data

US 2024/0061363 A1 Feb. 22, 2024

(30) Foreign Application Priority Data

Aug. 15, 2022 (JP) ................................ 2022-129426

(51) Int. Cl.
*G03G 15/16* (2006.01)

(52) U.S. Cl.
CPC ... *G03G 15/161* (2013.01); *G03G 2215/1661* (2013.01)

(58) Field of Classification Search
CPC .................... G03G 15/161; G03G 2215/1661
See application file for complete search history.

(56) References Cited

U.S. PATENT DOCUMENTS

| | | | | |
|---|---|---|---|---|
| 9,164,467 | B2 | 10/2015 | Mori et al. | |
| 2020/0133171 | A1* | 4/2020 | Ishizumi ............ | G03G 15/1685 |
| 2021/0325816 | A1* | 10/2021 | Ogura ................ | G03G 21/0011 |

FOREIGN PATENT DOCUMENTS

| | | |
|---|---|---|
| JP | 2005099763 | 4/2005 |
| JP | 2006145635 | 6/2006 |
| WO | 2015030120 | 3/2015 |

* cited by examiner

*Primary Examiner* — Stephanie E Bloss
*Assistant Examiner* — Michael A Harrison
(74) *Attorney, Agent, or Firm* — JCIPRNET

(57) ABSTRACT

An intermediate transfer belt cleaning system includes an intermediate transfer belt that has an outer peripheral surface to which a toner image is to be transferred and a cleaning device having a cleaning blade that comes into contact with the outer peripheral surface of the intermediate transfer belt to clean the outer peripheral surface, in which the cleaning blade has a peak value (tan $\delta_p$) of a loss tangent of 0.25 or more and 0.40 or less at a frequency of 1 Hz and a loss tangent (tan $\delta_{22}$) of 0.20 or more and 0.35 or less at 22° C. at a frequency of 1 Hz, the tan $\delta_p$ and the tan $\delta_{22}$ being determined by measuring temperature dependence of viscoelasticity of the cleaning blade, and a coefficient D of dynamic friction between the intermediate transfer belt and the cleaning blade is 0.30 or more and 0.80 or less.

10 Claims, 2 Drawing Sheets

INTERMEDIATE TRANSFER BELT CLEANING SYSTEM, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-129426 filed Aug. 15, 2022.

BACKGROUND

(i) Technical Field

The present disclosure relates to an intermediate transfer belt cleaning system, a transfer device, and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed. For the transfer of the toner image to a recording medium, for example, an intermediate transfer belt is used. In addition, for the cleaning of the outer peripheral surface of the intermediate transfer belt, a cleaning blade is used.

For example, JP2006-145635A discloses "a cleaning blade for an image forming apparatus formed of a thermoplastic resin composition that satisfies relationships of $0.5 \leq \tan\delta(24)/\tan\delta(0) \leq 1.0$, $0.7 \leq \tan\delta(32)/\tan\delta(24) \leq 1.0$, and $0.4 \leq \tan\delta(32)/\tan\delta(0) \leq 1.0$ in a temperature dispersion curve of a loss tangent tan δ determined by viscoelasticity measurement, where tan δ (0) represents a loss tangent at 0° C., tan δ (24) represents a loss tangent at 24° C., and tan δ (32) represents a loss tangent at 32° C."

JP2005-099763A discloses "an image forming apparatus having an image holder that holds a toner image and has a loss tangent tan δ1 satisfying $0.05 \leq \tan\delta 1 \leq 0.40$, a transfer unit that transfers the toner image held on the image holder to a recording medium, and a blade member that has an edge coming into contact with the image holder to remove a toner remaining on the image holder after the toner image is transferred to the recording medium from the image holder and has a loss tangent tan δ2, in which the loss tangent tan δ1 of the image holder is measured using a first test piece prepared by cutting and molding a part of the image holder, the first test piece includes a face coming into contact with the blade member, the loss tangent tan δ2 of the blade member is measured using a second test piece prepared by cutting and molding a part of the blade member, the second test piece has two faces including the edge coming into contact with the intermediate transfer belt and a face forming the edge, and the loss tangent tan δ1 of the image holder and the loss tangent δ2 of the blade member satisfy $0.25 \leq \tan\delta 1 + \tan\delta 2 \leq 0.65$".

WO2015/30120A discloses "a blade member used for removing a residual toner that remains on a surface of a counterpart member by coming into contact with sliding contact with the counterpart member in an image forming apparatus adopting an electrophotographic method, the blade member having a blade body made of polyurethane rubber using diphenylmethane diisocyanate and a polyester-based polyol as main materials and a coating film coating at least a surface of a sliding contact portion that is a site in the blade body and is allowed to come into sliding contact with the counterpart member, in which the polyurethane rubber has an international rubber hardness of 65 to 85 IRHD, a peak temperature of tan δ of 8° C. or lower, and a peak value of tan δ of 1.1 or less, and the coating film contains a hydrocarbon-based polymer as a main component".

SUMMARY

Aspects of non-limiting embodiments of the present disclosure relate to an intermediate transfer belt cleaning system having higher cleanliness maintainability of a cleaning blade, compared to an intermediate transfer belt cleaning system including a cleaning blade having a peak value ($\tan\delta_p$) of a loss tangent of less than 0.25 or more than 0.40 at a frequency of 1 Hz, the tan being determined by measuring temperature dependence of viscoelasticity, an intermediate transfer belt cleaning system including a cleaning blade having a loss tangent ($\tan\delta_{22}$) less than 0.20 or more than 0.35 at 22° C. at a frequency of 1 Hz, the $\tan\delta_{22}$ being determined by measuring temperature dependence of viscoelasticity, or an intermediate transfer belt cleaning system in which a coefficient D of dynamic friction between an intermediate transfer belt and a cleaning blade is less than 0.30 or more than 0.80.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided an intermediate belt cleaning system including:

- an intermediate transfer belt that has an outer peripheral surface to which a toner image is to be transferred; and
- a cleaning device having a cleaning blade that comes into contact with the outer peripheral surface of the intermediate transfer belt to clean the outer peripheral surface,
- in which the cleaning blade has a peak value ($\tan\delta_p$) of a loss tangent of 0.25 or more and 0.40 or less at a frequency of 1 Hz and a loss tangent (tan δ22) of 0.20 or more and 0.35 or less at 22° C. at a frequency of 1 Hz, the $\tan\delta_p$ and the $\tan\delta_{22}$ being determined by measuring temperature dependence of viscoelasticity of the cleaning blade, and
- a coefficient D of dynamic friction between the intermediate transfer belt and the cleaning blade is 0.30 or more and 0.80 or less.

BRIEF DESCRIPTION OF THE DRAWINGS

Exemplary embodiment(s) of the present invention will be described in detail based on the following figures, wherein.

DETAILED DESCRIPTION

Figure 1:
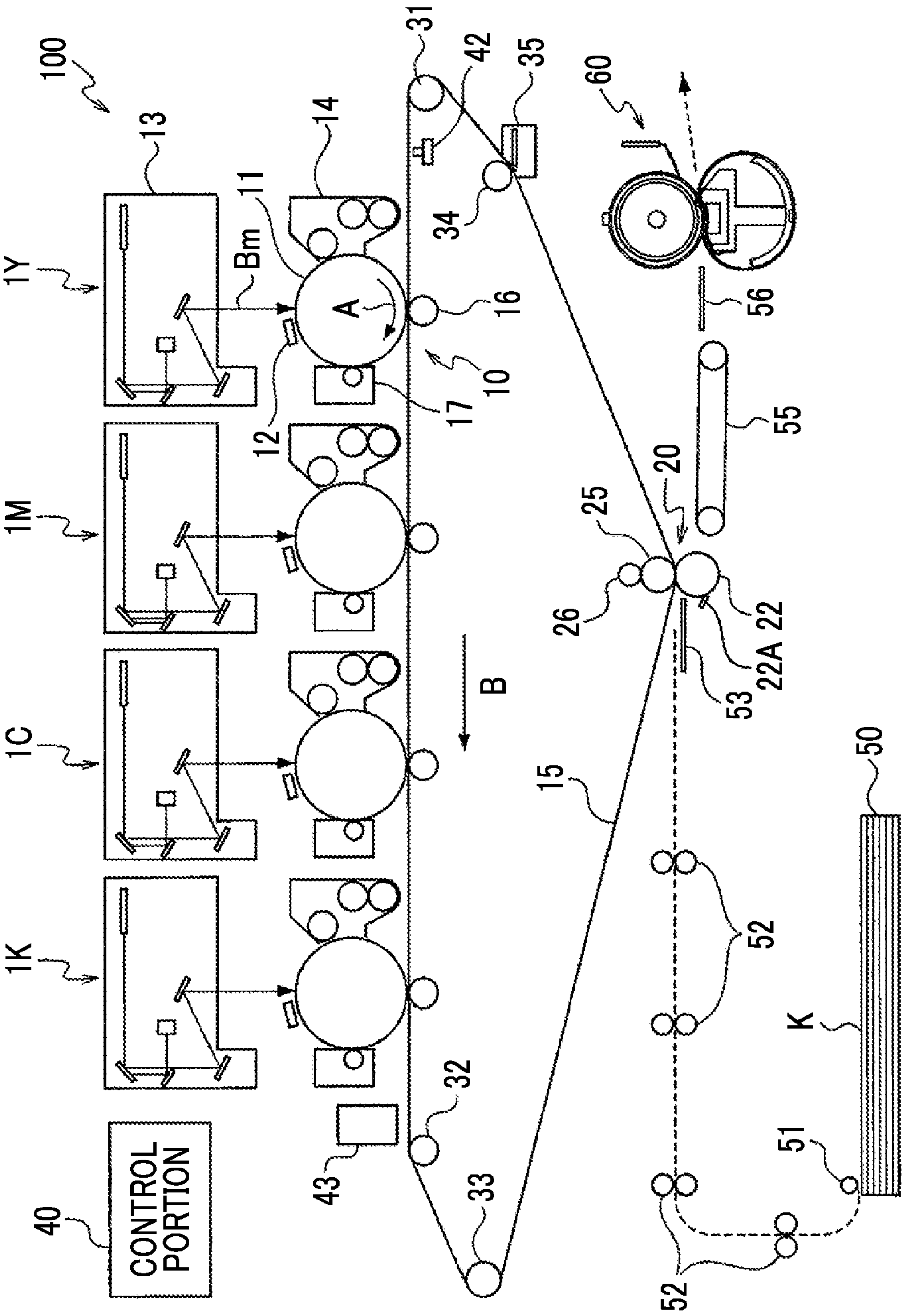
FIG. 1 is a schematic configuration view showing an example of an image forming apparatus according to the present exemplary embodiment.

Hereinafter, the present exemplary embodiment as an example of the present disclosure will be described. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with numerical values described in examples.

In the present exemplary embodiment, the term “step” includes not only an independent step but a step which is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Intermediate Transfer Belt Cleaning System

The intermediate transfer belt cleaning system according to the present exemplary embodiment includes an intermediate transfer belt that has an outer peripheral surface to which a toner image is to be transferred, and a cleaning device that has a cleaning blade coming into contact with the outer peripheral surface of the intermediate transfer belt to clean the outer peripheral surface.

The cleaning blade has a peak value (tan $\delta_p$) of a loss tangent of 0.25 or more and 0.40 or less at a frequency of 1 Hz and a loss tangent (tan $\delta_{22}$) of 0.20 or more and 0.35 or less at 22° C. at a frequency of 1 Hz, the tan and the tan $\delta_{22}$ being determined by measuring temperature dependence of viscoelasticity of the cleaning blade. A coefficient D of dynamic friction between the intermediate transfer belt and the cleaning blade is 0.30 or more and 0.80 or less.

Due to the above configuration, the intermediate transfer belt cleaning system according to the present exemplary embodiment is excellent in cleanliness maintainability of the cleaning blade. The reason is presumed as follows.

In the combination of an intermediate transfer belt and a cleaning blade of the related art, in a case where the cleaning blade is brought into contact with the intermediate transfer belt that is driven to rotate, a big vibration occurs in the cleaning blade, which sometimes hinders the cleaning blade from thoroughly cleaning the toner and causes the toner to slip through the cleaning blade. As a result, filming occurs on the intermediate transfer belt, and streak-like image defects occur in an image formed in the image forming apparatus.

“Filming” is a phenomenon where toner particles in a state of being crushed and stretched adhere to the surface of the intermediate transfer belt.

As a solution to the above problem, in the present exemplary embodiment, a peak value (tan $\delta_p$) of a loss tangent of the cleaning blade at a frequency of 1 Hz and a loss tangent (tan $\delta_{22}$) of the cleaning blade at 22° C. at a frequency of 1 Hz, the tan $\delta_p$ and the tan $\delta_{22}$ being determined by measuring temperature dependence of viscoelasticity of the cleaning blade, are set to fall into the above range, and a coefficient D of dynamic friction between the intermediate transfer belt and the cleaning blade is set to fall into the above range. It has been found that, as a result, the vibration that occurs in the cleaning blade due to the contact with the intermediate transfer belt is reduced. Consequently, the toner is inhibited from slipping through the cleaning blade, and the occurrence of filming on the intermediate transfer belt is suppressed. Furthermore, the occurrence of streak-like image defects in the image formed in the image forming apparatus is suppressed.

As described above, presumably, due to the above configuration, the intermediate transfer belt cleaning system according to the present exemplary embodiment may be excellent in cleanliness maintainability of the cleaning blade.

Cleaning Blade: Loss Tangent (Tan $\delta_{22}$) at 22° C.

The cleaning blade has a loss tangent (tan $\delta_{22}$) of 0.20 or more and 0.35 or less at 22° C. at a frequency of 1 Hz, the tan $\delta_{22}$ being determined by measuring temperature dependence of viscoelasticity of the cleaning blade.

In a case where the loss tangent (tan $\delta_{22}$) is less than 0.20, the cleaning blade poorly absorbs vibration, that is, the vibration that occurs in the cleaning blade due to the contact with the intermediate transfer belt driven to rotate increases. As a result, the toner slips through the cleaning blade, and streak-like image defects occur in the image in the image forming apparatus. On the other hand, in a case where the loss tangent (tan $\delta_{22}$) is more than 0.35, the viscosity of the cleaning blade increases, and pressure-sensitive adhesiveness of the cleaning blade to the intermediate transfer belt increases. Consequently, the vibration of the cleaning blade caused by the contact with the intermediate transfer belt increases, which causes the toner to slip through the cleaning blade and makes streak-like image defects in the image.

The loss tangent (tan $\delta_{22}$) at 22° C. is, for example, preferably 0.21 or more and 0.34 or less, and more preferably 0.23 or more and 0.32 or less.

Cleaning Blade: Peak Value (Tan $\delta_p$) of Loss Tangent

The cleaning blade has a peak value (tan $\delta_p$) of a loss tangent of 0.25 or more and 0.40 or less at a frequency of 1 Hz, the tan $\delta_p$ being determined by measuring temperature dependence of viscoelasticity of the cleaning blade.

The peak value (tan $\delta_p$) refers to a loss tangent at a temperature at which the loss tangent of the cleaning blade is maximized. The temperature is not particularly limited, and the peak value (tan $\delta_p$) may be found at a temperature of 22° C.

Having the peak value (tan $\delta_p$) of the loss tangent of 0.40 or less means that a difference between the loss tangent (tan $\delta_{22}$) at 22° C. and the peak value (tan $\delta_p$) of the loss tangent is not too big. Therefore, in a case where the peak value (tan $\delta_p$) of the loss tangent is 0.40 or less, the temperature dependence of viscoelasticity of the cleaning blade is reduced, that is, the vibration occurring in the cleaning blade is inhibited from varying with temperature. As a result, even in a case where the cleaning blade is exposed to an environment with a temperature different from the room temperature (about 22° C.), the vibration of the cleaning blade is suppressed, the toner is inhibited from slipping through the cleaning blade, and the occurrence of streak-like image defect in the image is suppressed.

On the other hand, in a case where the peak value (tan $\delta_p$) of the loss tangent is 0.25 or more, the cleaning blade keeps on absorbing vibration. Therefore, even in a case where the cleaning blade is exposed to an environment with a temperature different from the room temperature (about 22° C.), the vibration occurring in the cleaning blade due the contact with the intermediate transfer belt driven to rotate is suppressed. As a result, the toner is inhibited from slipping through the cleaning blade, and streak-like image defects occurring in the image in the image forming apparatus are reduced.

The peak value (tan $\delta_p$) of the loss tangent is, for example, preferably 0.26 or more and 0.38 or less, and more preferably 0.28 or more and 0.37 or less.

Cleaning Blade: Difference (Tan $\delta_p$−Tan $\delta_{22}$)

A difference (tan $\delta_p$−tan $\delta_{22}$) between the peak value (tan $\delta_p$) of the loss tangent and the loss tangent (tan $\delta_{22}$) at 22° C. is, for example, preferably 0 or more and 0.17 or less, and more preferably 0 or more and 0.15 or less.

In a case where the difference (tan $\delta_p$−tan $\delta_{22}$) is within the above range, the temperature dependence of viscoelasticity of the cleaning blade is reduced, that is, the vibration occurring in the cleaning blade is inhibited from varying with temperature. As a result, even in a case where the cleaning blade is exposed to an environment with a temperature different from the room temperature (about 22° C.), the vibration of the cleaning blade is suppressed, the toner is inhibited from slipping through the cleaning blade, and the occurrence of streak-like image defect in the image is suppressed.

Measurement of Temperature Dependence of Viscoelasticity

How to measure the temperature dependence of viscoelasticity of the cleaning blade will be described.

By using Exstar-DMS-6100 (Hitachi High-Tech Corporation. (formerly Seiko Instruments Inc.)), the cleaning blade cut in the form of a strip having a width of 5 mm and a length of 40 mm is fixed to tensile measurement parts at a chuck distance of 20 mm, a storage modulus and a loss modulus are measured at a frequency of 1 Hz in a temperature range of −40° C. or higher and 60° C. or lower, and a loss tangent (tan δ) at each temperature is calculated.

Among the loss tangents measured at each temperature, the largest loss tangent corresponds to the peak value (tan $\delta_p$) of the loss tangent, and the loss tangent at a temperature of 22° C. corresponds to the loss tangents (tan $\delta_{22}$).

Coefficient D of Dynamic Friction

A coefficient D of dynamic friction between the intermediate transfer belt and the cleaning blade is 0.30 or more and 0.80 or less.

In a case where the coefficient D of dynamic friction is less than 0.30, the friction at a position where the tip of the cleaning blade comes into contact with the intermediate transfer belt is too weak. Accordingly, the toner is poorly scrapped off by the friction, which deteriorates the cleaning performance. On the other hand, in a case where the coefficient D of dynamic friction is more than 0.80, the friction between the intermediate transfer belt and the cleaning blade is too strong. Accordingly, the vibration of the cleaning blade caused by the contact with the intermediate transfer belt increases, the toner slips through the cleaning blade, and streak-like image defects occur in the image.

The coefficient D of dynamic friction is, for example, preferably 0.35 or more and 0.75 or less, and more preferably 0.38 or more and 0.70 or less.

Measurement of Coefficient D of Dynamic Friction

The coefficient D of dynamic friction is measured as follows.

A sample of the intermediate transfer belt is fixed on a stage, and the cleaning blade is brought into contact with the fixed sample of the intermediate transfer belt. In this state, a load (normal force) is applied to the cleaning blade in a vertical direction, and the intermediate transfer belt is moved in a horizontal direction at a constant speed. At this time, the frictional force between the sample of the intermediate transfer belt and the blade is measured, and a coefficient D of friction=frictional force/normal force is calculated.

Cleaning Blade: Martens Hardness of Polyurethane Rubber Member

From the viewpoint of making it easy to control the loss tangent (tan $\delta_{22}$) of the cleaning blade at 22° C., the peak value (tan $\delta_p$) of the loss tangent, and the coefficient D of dynamic friction between the intermediate transfer belt and the cleaning blade within the above ranges, it is preferable that a contact portion of the cleaning blade coming into contact with the intermediate transfer belt be configured with, for example, a polyurethane rubber member.

Furthermore, the Martens hardness of the polyurethane rubber member is, for example, preferably 1.0 $N/mm^2$ or more and 3.5 $N/mm^2$ or less, and more preferably 1.5 $N/mm^2$ or more and 3.0 $N/mm^2$ or less. In a case where the Martens hardness of the polyurethane rubber member in the cleaning blade is within the above range, the cleanliness maintainability of the cleaning blade is further improved.

Measurement of Martens Hardness

The Martens hardness of the polyurethane rubber member is measured as follows.

By using PICODENTOR (registered trademark) HM500 (FISCHER INSTRUMENTS K.K.), a load increasing up to 5 mN is applied to the polyurethane rubber member for 20 seconds by using the Berkovich indenter, creep is caused for 5 seconds, and then the load is reduced to 0 mN for 20 seconds, thereby obtaining a stress-strain curve. The Martens hardness is calculated from this stress-strain curve.

Intermediate Transfer Belt

Layer Configuration

Examples of the intermediate transfer belt include a single layer of a polyimide-based resin or a laminate having a polyimide-based resin layer as the outermost surface layer.

For example, the outer peripheral surface of the intermediate transfer belt may be configured with a polyimide-based resin layer.

In a case where the intermediate transfer belt is configured with a laminate having a polyimide-based resin layer as the outermost surface layer, the intermediate transfer belt in which the polyimide-based resin layer is provided on a resin substrate layer is adopted. An interlayer (such as an elastic layer) may be provided between the substrate layer and the polyimide-based resin layer.

As the resin substrate layer and the interlayer (such as an elastic layer), known layers adopted for intermediate transfer belts are used.

Configuration of Polyimide-Based Resin Layer

The polyimide-based resin layer contains, for example, a polyimide-based resin and conductive carbon particles. The polyimide-based resin layer preferably contains, for example, a release agent.

As necessary, the polyimide-based resin layer may contain other known components.

The polyimide-based resin layer is a layer containing a polyimide-based resin as a component having the greatest mass among the components configuring the resin layer.

Polyimide-Based Resin

The polyimide-based resin means a resin containing a constitutional unit having an imide bond.

Examples of the polyimide-based resin include a polyimide resin, a polyamide-imide resin, and a polyetherimide resin.

From the viewpoint of cleanliness maintainability, as the polyimide-based resin, among the above, for example, a polyimide resin and a polyamide-imide resin are preferable, and a polyimide resin is more preferable.

Examples of the polyimide resin include an imidized polyamic acid (polyimide resin precursor) which is a polymer of a tetracarboxylic acid dianhydride and a diamine compound.

Examples of the polyimide resin include a resin having a constitutional unit represented by General Formula (I).

General Formula (I)

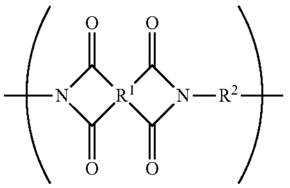

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid di anhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bis(3,4-dicarboxyphenyl)sulfonic acid dianhydride, a perylene-3,4,9,10-Tetracarboxylic acid dianhydride, a bis(3,4-dicarboxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-6-aminophenyl) benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylenediamine, 3-methylheptamethylenediamine, 4,4-dimethylheptamethylenediamine, 2,11-diaminododecane, 1,2-bis-3-amino-propoxyethane, 2,2-dimethylpropylenediamine, 3-methoxy-hexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

From the viewpoint of mechanical strength, volume resistivity adjustment, and the like, the content of the polyimide-based resin with respect to the polyimide-based resin layer is, for example, preferably 60% by mass or more and 95% by mass or less, more preferably 70% by mass or more and 95% by mass or less, and even more preferably 75% by mass or more and 90% by mass or less.

Conductive Carbon Particles

Examples of the conductive carbon particles include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the conductive carbon particles is, for example, preferably 2 nm or more and 40 nm or less, more preferably 8 nm or more and 20 nm or less, and even more preferably 10 nm or more and 15 nm or less.

The average particle size of the conductive carbon particles is measured by the following method.

First, by a microtome, a measurement sample having a thickness of 100 nm is collected from the polyimide-based resin layer and observed with a transmission electron microscope (TEM). Then, the diameters of circles each having an area equivalent to the projected area of each of 50 conductive carbon particles (that is, equivalent circle diameters) are adopted as particle diameters, and the average thereof are adopted as the average particle size.

From the viewpoint of mechanical strength and volume resistivity, the content of the conductive carbon particles is, for example, preferably 10% by mass or more and 50% by mass or less with respect to the polyimide-based resin layer.

Other Components

Examples of other components include a conducting agent other than conductive carbon particles, a filler for improving mechanical strength, an antioxidant for preventing thermal deterioration of a belt, a surfactant for improving fluidity, a heat-resistant antioxidant, and a release agent.

In a case where the polyimide-based resin layer contains other components, the content of the other components with respect to the polyimide-based resin layer is, for example, preferably more than 0% by mass and 10% by mass or less, more preferably more than 0% by mass and 5% by mass or less, and even more preferably more than 0% by mass and 1% by mass or less.

Thickness of Polyimide-Based Resin Layer

In a case where the intermediate transfer belt is configured with a single polyimide-based resin layer, from the viewpoint of mechanical strength, the thickness of the polyimide-based resin layer is, for example, preferably 60 μm or more and 120 μm or less, and more preferably 80 μm or more and 120 μm or less.

In a case where the intermediate transfer belt is configured with a laminate having the polyimide-based resin layer as the outermost surface layer, from the viewpoint of manufacturing suitability and from the viewpoint of suppressing discharge, the thickness of the polyimide-based resin layer is, for example, preferably 1 μm or more and 60 μm or less, and more preferably 3 μm or more and 60 μm or less.

The thickness of the polyimide-based resin layer is measured as follows.

That is, a cross section of the polyimide-based resin layer taken along the thickness direction is observed with an optical microscope or a scanning electron microscope, the thickness of the layer as a measurement target is measured at 10 sites, and the average thereof is adopted as the thickness.

Volume resistivity of intermediate transfer belt From the viewpoint of transferability, the common logarithm of the volume resistivity that the intermediate transfer belt has in a case where a voltage of 500 V is applied thereto for 10 seconds is, for example, 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Surface Resistivity of Intermediate Transfer Belt

From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit of the surface resistivity, log Ω/suq., expresses the surface resistivity in a logarithm of resistance per unit area, which is also written as log(Ω/suq.), Log Ω/suquare, log Ω/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Cleaning Blade

Configuration

The cleaning blade may be configured, for example, with a single layer, two layers, or three or more layers, or may have other configurations.

Examples of the cleaning blade configured with a single layer include a cleaning blade configured with a single material as a whole including the contact portion coming into contact with the intermediate transfer belt (that is, a cleaning blade consisting of a contact member).

Examples of the cleaning blade configured with two layers include a cleaning blade provided with a first layer that consists of a contact member including a contact portion coming into contact with the intermediate transfer belt and a second layer as a back surface layer that is formed on the back surface side of the first layer and consists of a material different from the contact member.

Examples of the cleaning blade configured with three or more layers include a cleaning blade having another layer between the first layer and the second layer in the aforementioned cleaning blade configured with two layers.

The cleaning blade is used, for example, by being supported by a rigid plate-shaped supporting material.

Contact Portion Coming into Contact with Intermediate Transfer Belt

The contact portion of the cleaning blade coming into contact with the intermediate transfer belt may be configured with, for example, a polyurethane rubber member.

Polyurethane Rubber

The polyurethane rubber is obtained by polymerizing at least a polyol component and a polyisocyanate component. As necessary, the polyurethane rubber may be obtained by polymerizing a resin having a functional group capable of reacting with an isocyanate group of polyisocyanate, in addition to the polyol component.

It is preferable that the polyurethane rubber have, for example, a hard segment and a soft segment. In the polyurethane rubber material, "hard segment" means a segment that consists of a material relatively harder than a material configuring "soft segment", and "soft segment" means a segment that consists of a material relatively softer than the material configuring "hard segment".

Examples of the material configuring the hard segment (hard segment material) include a low-molecular-weight polyol component among polyol components, and a resin having a functional group capable of reacting with an isocyanate group of a polyisocyanate. On the other hand, examples of the material configuring the soft segment (soft segment material) include a high-molecular-weight polyol component among polyol components.

The average particle size of aggregates of the hard segment is, for example, preferably 1 μm or more and 10 μm or less, and more preferably 1 μm or more and 5 μm or less.

In a case where the average particle size of the aggregates of the hard segment is 1 μm or more, the frictional resistance of the surface of the contact member is likely to be reduced. Therefore, the behavior of the blade is stabilized, and local abrasion is likely to be suppressed.

On the other hand, in a case where the average particle size of the aggregates of the hard segment is 10 μm or less, the occurrence of chipping is likely to be suppressed.

The average particle size of the aggregates of the hard segment is measured as follows. By using a polarizing microscope (BX51-P manufactured by Olympus Corporation), an image is captured at 20× magnification, and image processing is performed to convert the image into a binary image. For each of 20 cleaning blades, particle diameters (equivalent circle diameters) of aggregates are measured at 5 spots (at each spot, particle diameters of 5 aggregates are measured), and the average particle size of the 500 aggregates is calculated.

To binarize the image, by using the image processing software OLYMPUS Stream essentials (manufactured by Olympus Corporation), the thresholds of color/chroma/luminance are adjusted such that crystalline portions and aggregates of the hard segment appear black and amorphous portions (corresponding to the soft segment) appear white.

Polyol Component

The polyol component includes a high-molecular-weight polyol and a low-molecular-weight polyol.

The high-molecular-weight polyol component is a polyol having a number-average molecular weight of 500 or more (for example, preferably 500 or more and 5,000 or less). Examples of the high-molecular-weight polyol component include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

The number-average molecular weight is a value measured by gel permeation chromatography (GPC). The same shall apply hereinafter.

Each of the high-molecular-weight polyols may be used alone, or two or more kinds of the high-molecular-weight polyols may be used in combination.

The polymerization ratio of the high-molecular-weight polyol component to all the polymerization components of the polyurethane rubber may be, for example, 30 mol % or more and 50 mol % or less, and is preferably 40 mol % or more and 50 mol % or less.

The low-molecular-weight polyol component is a polyol having a molecular weight (number-average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanedecanediol. Among these, 1,4-butanediol is used as the low-molecular-weight polyol component.

Examples of the low-molecular-weight polyol component also include a diol (difunctional), a triol (trifunctional), and a tetraol (tetrafunctional) which are well known as chain extenders and crosslinking agents.

Each of the polyols may be used alone, or two or more kinds of the polyols may be used in combination.

The polymerization ratio of the low-molecular-weight polyol component to all the polymerization components of the polyurethane rubber may be, for example, more than 50 mol % and 75 mol % or less, preferably 52 mol % or more and 75 mol % or less, more preferably 55 mol % or more and 75 mol % or less, and even more preferably 55 mol % or more and 60 mol % or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4-diisocyanate (TODI).

As the polyisocyanate component, for example, 4,4'-diphenylmethane diisocyanate (MDI), 1,5-naphthalene diisocyanate (NDI), and hexamethylene diisocyanate (HDI) are more preferable.

Each of the polyisocyanate components may be used alone, or two or more kinds of the polyisocyanate components may be used in combination.

The polymerization ratio of the polyisocyanate component to all the polymerization components of the polyurethane rubber may be, for example, 5 mol % or more and 25 mol % or less, and preferably 10 mol % or more and 20 mol % or less.

Resin having functional group capable of reacting with isocyanate group.

As the resin having a functional group capable of reacting with an isocyanate group (hereinafter, called "functional group-containing resin"), for example, a flexible resin is preferable, and an aliphatic resin having a linear structure is more preferable in view of flexibility. Specific examples of the functional group-containing resin include an acrylic resin containing two or more hydroxyl groups, a polybutadiene resin containing two or more hydroxyl groups, and an epoxy resin having two or more epoxy groups.

Examples of commercially available products of acrylic resins containing two or more hydroxyl groups include ACTFLOW manufactured by Soken Chemical & Engineering Co., Ltd. (grades: UMB-2005B, UMB-2005P, UMB-2005, UME-2005, and the like).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is preferable which is not hard and brittle just as the general epoxy resins of the related art and is more flexible and tougher than the epoxy resin of the related art. As such an epoxy resin, for example, in view of molecular structure, an epoxy resin is preferable which has a structure (flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In view of physical properties, for example, an epoxy resin is preferable which has a lower viscosity for the molecular weight compared to the epoxy resins of the related art. Specifically, for example, an epoxy resin is preferable which has a weight-average molecular weight in a range of 900±100 and a viscosity at 25° C. in a range of 15,000±5,000 mPa s, and an epoxy resin is more preferable which has a viscosity at 25° C. in a range of 15,000±3,000 mPa s. Examples of commercially available products of epoxy resins having such characteristics include EPICLON EXA-4850-150 manufactured by DIC Corporation.

The polymerization ratio of the functional group-containing resin may be, for example, in a range that does not impair the characteristics of the cleaning blade.

Manufacturing Method of Polyurethane Rubber

For manufacturing the polyurethane rubber, a general polyurethane manufacturing method, such as a prepolymer method or a one-shot method, is used. With the prepolymer method, polyurethane extremely resistant to abrasion and chipping is obtained. Therefore, this method is suited for the present exemplary embodiment, but the present exemplary embodiment is not limited by the manufacturing method.

The cleaning blade is prepared by forming a composition for forming a cleaning blade prepared by the above method into a sheet by using, for example, centrifugal molding, extrusion molding, or the like and processing the sheet by cutting or the like.

Examples of catalysts used for manufacturing the polyurethane rubber include an amine-based compound such as a tertiary amine, a quaternary ammonium salt, and an organometallic compound such as an organotin compound.

Examples of the tertiary amine include a trialkylamine such as triethylamine, a tetraalkyldiamine such as N,N,N',N'-tetramethyl-1,3-butanediamine, an amino alcohol such as dimethylethanolamine, an ester amine such as an ethoxylated amine, an ethoxylated diamine, and bis(di ethyl ethanol amine)adipate, triethylenediamine (TEDA), a cyclohexyl amine derivative such as N,N-dimethylcyclohexylamines, a morpholine derivative such as N-methylmorpholine, N-(2-hydroxypropyl)-dimethylmorpholine, and a piperazine derivative such as N,N'-diethyl-2-methyl piperazine or N,N'-bi s-(2-hydroxypropyl)-2-methyl piperazine.

Examples of the quaternary ammonium salt include 2-hydroxypropyltrimethylammonium·octylate, 1,5-diazabicyclo[4.3.0]nonene-5 (DBN)·octylate, 1,8-diazabicyclo[5.4.0]undecene-7 (DBU)-octylate, DBU-oleate, DBU-p-toluenesulfonate, DBU-formate, and 2-hydroxypropyltrimethylammonium·formate.

Examples of the organotin compound include a dialkyltin compound such as dibutyltin dilaurate or dibutyltin di(2-ethylhexanoate), stannous 2-ethylcaproate, and stannous oleate.

Among these catalysts, in view of hydrolysis resistance, triethylenediamine (TEDA), which is a tertiary ammonium salt, is used. Furthermore, in view of processability, for example, a quaternary ammonium salt is used. Among the quaternary ammonium salts, for example, 1,5-diazabicyclo[4.3.0]nonene-5 (DBN)·octylate, 1,8-diazabicyclo[5.4.0]undecene-7 (DBU)-octylate, and DBU-formate, which are highly reactive, are used.

The content of the catalysts with respect to the total mass of the polyurethane rubber configuring the contact member is, for example, preferably in a range of 0.0005% by mass or more and 0.03% by mass or less, and particularly preferably 0.001% by mass or more and 0.01% by mass or less.

Each of the catalysts may be used alone, or two or more kinds of the catalysts may be used in combination.

Modification of Contact Portion

The polyurethane rubber member configuring the contact portion may have, as a surface layer, an impregnated and cured layer of an isocyanate compound.

The surface layer of the polyurethane rubber member configuring the contact portion means a region up to 200 μm upward from the surface of the contact portion.

The impregnated and cured layer is a layer obtained by impregnating the surface layer of an elastic layer with a surface treatment liquid containing an isocyanate compound and an organic solvent, and curing the surface treatment liquid (that is, the isocyanate compound).

The impregnated and cured layer is formed as a layer integrated with the surface layer of the contact portion such that the density of the layer gradually decreases toward the inside from the surface.

Examples of the isocyanate compound include 2,6-toluene diisocyanate (TDI), 4,4'-diphenylmethane diisocyanate (MDI), paraphenylenediisocyanate (PPDI), 1,5-naphthalene diisocyanate (NDI), 3,3-dimethyldiphenyl-4,4'-diisocyanate (TODI), and multimers and modification products of these.

The surface layer of the polyurethane rubber member configuring the contact portion may have a layer impregnated with diamond-like carbon. A diamond-like carbon layer may be provided on the surface of the polyurethane rubber member configuring the contact portion.

Physical Properties of Contact Portion

It is preferable that the contact portion of the cleaning blade coming into contact with the intermediate transfer belt be configured, for example, with a polyurethane rubber member, and that the Martens hardness of the polyurethane rubber member be within the aforementioned range. In a case where the Martens hardness of the polyurethane rubber member configuring the contact portion of the cleaning blade is within the above range, it is easy to control the loss tangent (tan $\delta_{22}$) of the cleaning blade at 22° C., the peak value (tan $\delta_p$) of the loss tangent, and the coefficient D of dynamic friction between the intermediate transfer belt and the cleaning blade within the above ranges.

A pressing force NF for pressing the cleaning blade on the intermediate transfer belt is, for example, preferably 0.05 N·m or more and 5.0 N·m or less, and more preferably 0.1 N·m or more and 3.0 N·m or less.

The pressing force NF of the cleaning blade is calculated by the following formula.

Formula: Pressing force NF=k×d

Figure 2:
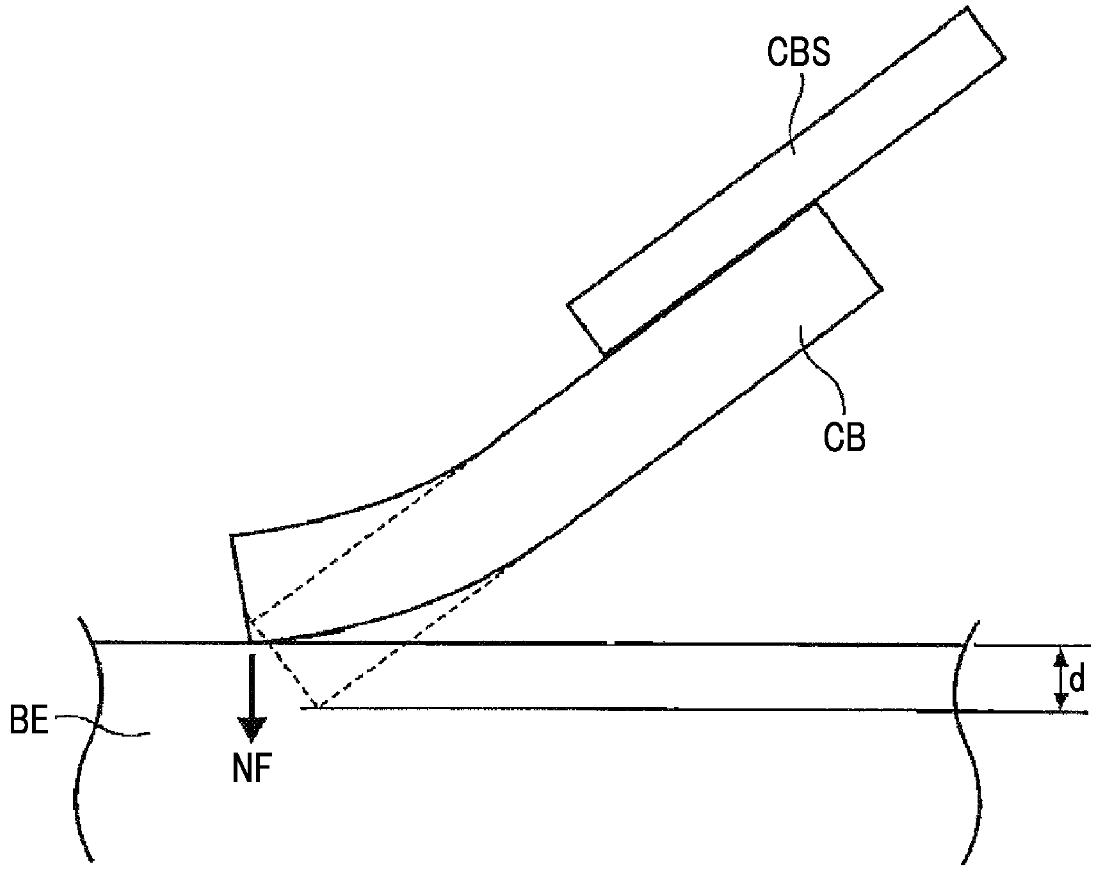
FIG. 2 is a schematic view for illustrating an intrusion d of the cleaning blade into the intermediate transfer belt.

In the formula, k represents a spring constant unique to the cleaning blade, and d represents an intrusion of the cleaning blade into the intermediate transfer belt (see FIG. 2).

The spring constant k unique to the cleaning blade is obtained by causing displacement of a cleaning blade 12 and measuring the load with a load cell.

The intrusion d of the cleaning blade into the intermediate transfer belt is obtained by fixing the cleaning blade 12 to a support member and calculating the amount of displacement of the cleaning blade caused in a case where the cleaning blade is brought into contact with the intermediate transfer belt.

The intrusion d of the cleaning blade into the intermediate transfer belt is, for example, preferably 0 mm or more and 10 mm or less, and more preferably 0.01 mm or more and 5 mm or less.

In FIG. 2, BE represents the intermediate transfer belt, CB represents the cleaning blade, and CBS represents the support member that supports the cleaning blade.

Transfer Device

The transfer device according to the present exemplary embodiment includes an intermediate transfer belt cleaning system described above as the intermediate transfer belt cleaning system according to the present exemplary embodiment, a primary transfer device that has a primary transfer member performing primary transfer of a toner image formed on a surface of an image holder to the outer peripheral surface of the intermediate transfer belt, and a secondary transfer device that has a secondary transfer member that performs secondary transfer of the toner image transferred to the outer peripheral surface of the intermediate transfer belt by the primary transfer to a surface of a recording medium.

Primary Transfer Device

In the primary transfer device, the primary transfer member is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the outer peripheral surface of the intermediate transfer belt is performed.

Secondary Transfer Device

In the secondary transfer device, the secondary transfer member is arranged on a toner image-holding side of the intermediate transfer belt. The secondary transfer device includes, for example, a secondary transfer member and a back surface member that is arranged on the side opposite to the toner image-holding side of the intermediate transfer belt. In the secondary transfer device, the intermediate transfer belt and the recording medium are interposed between the secondary transfer member and the back surface member, and a transfer electric field is formed. In this way, secondary transfer of the toner image formed on the intermediate transfer belt to the recording medium is performed.

The secondary transfer member may be a secondary transfer roll or a secondary transfer belt. As the back surface member, for example, a back roll is used.

Other Configurations of Transfer Device

The transfer device according to the present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from an image holder, performing secondary transfer of the toner image to a second intermediate transfer belt from the first intermediate transfer belt, and then performing tertiary transfer of the toner image to a recording medium from the second intermediate transfer belt.

As at least one of the plurality of intermediate transfer belts of the transfer device, the intermediate transfer belt according to the present exemplary embodiment is used.

Image Forming Apparatus

The image forming apparatus according to the present exemplary embodiment includes a toner image forming device that has an image holder and forms a toner image on a surface of the image holder and a transfer device that transfers the toner image formed on the surface of the image holder to a surface of a recording medium and is the transfer device according to the present exemplary embodiment described above.

Examples of the toner image forming device include a device including an image holder, a charging device that charges the surface of the image holder, an electrostatic latent image forming device that forms an electrostatic latent image on the surface of the charged image holder, and a developing device that develops the electrostatic latent image formed on the surface of the image holder with a developer containing a toner so as to form a toner image.

As the image forming apparatus according to the present exemplary embodiment, known image forming apparatuses are used which include an apparatus including a fixing unit that fixes a toner image transferred to the surface of a recording medium; an apparatus including a cleaning device that cleans the surface of an image holder not yet being charged after transfer of a toner image; an apparatus including an electricity removing device that removes electricity by irradiating the surface of an image holder, the image holder not yet being charged, with electricity removing light after transfer of a toner image; an apparatus including an image holder heating member that raises the temperature of an image holder so as to reduce relative temperature, and the like.

The image forming apparatus according to the present exemplary embodiment may be either an image forming apparatus for a dry developing method or an image forming apparatus for a wet developing method (developing method using a liquid developer).

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Hereinafter, an example of the image forming apparatus according to the present exemplary embodiment will be described with reference to drawings. Here, the image forming apparatus according to the present exemplary embodiment is not limited thereto. Hereinafter, among the parts shown in the drawing, main parts will be described, and others will not be described.

Image Forming Apparatus

FIG. 1 is a schematic configuration view showing the configuration of the image forming apparatus according to the present exemplary embodiment.

As shown in FIG. 1, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 (an example of an image holder) that holds the toner image formed on the surface thereof and rotates in the direction of an arrow A.

As an example of a charging unit, a charger 12 for charging the photoreceptor 11 is provided around the photoreceptor 11. As an example of a latent image forming unit, a laser exposure machine 13 that draws an electrostatic latent image on the photoreceptor 11 is provided (in FIG. 1, an exposure beam is represented by a mark Bm).

Around the photoreceptor 11, as an example of a developing unit, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 1 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided to face an intermediate transfer belt-cleaning blade 35 scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is arranged to be pressed on the photoreceptor 11 across the intermediate transfer belt 15. Furthermore, the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The back roll 25 is formed such that the surface resistivity thereof is $1\times10^7\Omega/\square$ or more and $1\times10^{10}\Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 so as to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ωcm or more and $10^{8.5}$ Ωcm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, the intermediate transfer belt-cleaning blade 35 separable from the intermediate transfer belt 15 is provided which removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The intermediate transfer belt 15, the primary transfer roll 16, the secondary transfer roll 22, and the intermediate transfer belt-cleaning blade 35 correspond to an example of the transfer device.

The image forming apparatus 100 may have a configuration in which the apparatus includes a secondary transfer belt (an example of a secondary transfer member) instead of the secondary transfer roll 22.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is supplied from the paper storage portion 50. The paper K supplied from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

On the other hand, after the transfer to the paper K is finished, the residual toner remaining on the intermediate transfer belt 15 is transported to the intermediate transfer belt-cleaning blade 35 as the intermediate transfer belt 15 rotates, and is removed from the intermediate transfer belt 15 by the intermediate transfer belt-cleaning blade 35.

Hitherto, the present exemplary embodiment has been described. However, the present exemplary embodiment is not limited to the above exemplary embodiments, and various modifications, changes, and ameliorations can be added thereto.

EXAMPLES

Examples of the present disclosure will be described below, but the present disclosure is not limited to the following examples. In the following description, unless otherwise specified, "parts" and "%" are based on mass in all cases.

Preparation of Intermediate Transfer Belt

Intermediate Transfer Belt (1)

Carbon black particles are dispersed in a polyamic acid solution, thereby preparing a coating liquid 1. The coating liquid is applied onto a cylindrical mold to form a coating film, followed by a drying treatment (substrate 1).

Then, other carbon black particles are dispersed in a polyamic acid solution, thereby preparing a coating liquid 2. The coating liquid 2 is applied onto a substrate 1, followed by a drying treatment. Thereafter, the substrate 1 is subjected to a baking step and then cut.

By the above operation, a polyimide intermediate transfer belt (1) is obtained.

Preparation of Cleaning Blade

Cleaning Blade (1): Example 1

A polycaprolactone polyol (manufactured by Daicel Corporation, PLACCEL 205) and a polycaprolactone polyol (manufactured by Daicel Corporation, PLACCEL 240) are used as a hard segment material of a polyol component. Furthermore, an acrylic resin containing two or more hydroxy groups (Soken Chemical & Engineering Co., Ltd., ACTFLOW™ UMB-2005B) is used as a soft segment material. The aforementioned hard segment material and the soft segment material are mixed together at a ratio of 85:15 (mass ratio).

Then, as an isocyanate compound, 4,4'-diphenylmethane diisocyanate (manufactured by Nippon Polyurethane Industry Co., Ltd., MILLIONATE MT) is added to 100 parts of the mixture of the hard segment material and the soft segment material, and the obtained mixture is reacted at 70° C. for 3 hours in a nitrogen atmosphere. Subsequently, the aforementioned isocyanate compound is further added thereto, and the obtained mixture is reacted at 70° C. for 3 hours in a nitrogen atmosphere, thereby obtaining a prepolymer.

Thereafter, the prepolymer is heated to 100° C. and defoamed under reduced pressure for 1 hour. Then, a mixture of 1,4-butanediol and trimethylolpropane is added to the prepolymer and mixed for 3 minutes such that air bubbles are not created, thereby preparing a composition for forming a cleaning blade. The composition for forming a cleaning blade is poured into a centrifugal molding machine and subjected to a curing reaction.

Subsequently, the cleaning blade is immersed in a 4,4'-diphenylmethane diisocyanate (manufactured by Nippon Polyurethane Industry Co., Ltd., MILLIONATE MT) bath at 80° C. for 10 minutes, then taken out of the bath, aged and heated, then dried at room temperature (22° C.), and cut in a length of 15 mm and a thickness of 2 mm.

By the above operation, a cleaning blade (1) is obtained.

Cleaning Blade (2): Example 2

A cleaning blade (2) is obtained in the same manner as the manner adopted for preparing the cleaning blade (1), except that the hard segment material and the soft segment material are mixed together at a ratio of 90:10 (mass ratio).

Cleaning Blade (3): Example 3

A cleaning blade (3) is obtained in the same manner as the manner adopted for preparing the cleaning blade (1), except that the hard segment material and the soft segment material are mixed together at a ratio of 80:20 (mass ratio).

Cleaning Blade (4): Example 4

A cleaning blade (4) is obtained in the same manner as the manner adopted for preparing the cleaning blade (3), except that the cleaning blade is immersed in a 4,4'-diphenylmethane diisocyanate (manufactured by Nippon Polyurethane Industry Co., Ltd., MILLIONATE MT) bath at 80° C. for 20 minutes.

Cleaning Blade (5): Example 5

A cleaning blade (5) is obtained in the same manner as the manner adopted for preparing the cleaning blade (2), except that the cleaning blade is immersed in a 4,4'-diphenylmethane diisocyanate (manufactured by Nippon Polyurethane Industry Co., Ltd., MILLIONATE MT) bath at 80° C. for 5 minutes.

Cleaning Blade (6): Example 6

A cleaning blade (6) is obtained in the same manner as the manner adopted for preparing the cleaning blade (1), except that changes are made such that 4,4'-diphenylmethane diisocyanate is added to 100 parts of the mixture of the hard segment material and the soft segment material and reacted at 70° C. for 2 hours in a nitrogen atmosphere, and the aforementioned isocyanate compound is then further added thereto and reacted at 70° C. for 2 hours in a nitrogen atmosphere.

Cleaning Blade (7): Example 7

A cleaning blade (7) is obtained in the same manner as the manner adopted for preparing the cleaning blade (1), except that changes are made such that 4,4'-diphenylmethane diisocyanate is added to 100 parts of the mixture of the hard segment material and the soft segment material and reacted at 70° C. for 4 hours in a nitrogen atmosphere, and the aforementioned isocyanate compound is then further added thereto and reacted at 70° C. for 4 hours in a nitrogen atmosphere.

Cleaning Blade (A1): Comparative Example 1

A cleaning blade (A1) is obtained in the same manner as the manner adopted for preparing the cleaning blade (1), except that the hard segment material and the soft segment material are mixed together at a ratio of 97:3 (mass ratio).

Cleaning Blade (A2): Comparative Example 2

A cleaning blade (A2) is obtained in the same manner as the manner adopted for preparing the cleaning blade (1), except that the hard segment material and the soft segment material are mixed together at a ratio of 65:35 (mass ratio), a composition for forming a cleaning blade is poured into a centrifugal molding machine and subjected to a curing reaction, and then the cleaning blade is directly cut in a length of 15 mm and a thickness of 2 mm without being immersed in a 4,4'-diphenylmethane diisocyanate bath.

Cleaning Blade (A3): Comparative Example 3

A cleaning blade (A3) is obtained in the same manner as the manner adopted for preparing the cleaning blade (1), except that the hard segment material and the soft segment material are mixed together at a ratio of 96:4 (mass ratio).

Examples 1 to 7 and Comparative Examples 1 to 3

According to the combination shown in Table 1, an intermediate transfer belt and a cleaning blade for an intermediate transfer belt are mounted on an image forming apparatus “ApeosPort-VI C7771 from FUJIFILM Business Innovation Japan Corp.”. As conditions for mounting the cleaning blade for an intermediate transfer belt, a pressing force NF (Normal Force) is set to 2.5 gf/mm, and an angle W/A (Working Angle) is set to 10°.

By using the image forming apparatus, the following evaluation is performed.

Evaluation on Cleanliness Maintainability

In an environment at 22° C. and a humidity of 55% RH, a test image is printed on 500,000 sheets of A4 paper. As an index of cleanliness of image portions, that is, as an index of residual toner removability, for the 500,000th image, the state where streak-like image defects (color streaks) occur is evaluated based on the following standard by visual observation.

Evaluation Standard

A: No color streaks are found in the 500,000th image.

B: Extremely few color streaks are found in the 500,000th image.

C: Although some color streaks are found in the 500,000th image, the color streaks are acceptable.

D: Color streaks are found in the 500,000th image, which is out of the allowable range.

(((3)))

The intermediate transfer belt cleaning system according to (((1))) or (((2))), wherein the loss tangent (tan $\delta_{22}$) at 22° C. is 0.21 or more and 0.34 or less.

(((4)))

The intermediate transfer belt cleaning system according to any one of (((1))) to (((3))), wherein the coefficient D of dynamic friction is 0.35 or more and 0.75 or less.

(((5)))

The intermediate transfer belt cleaning system according to any one of (((1))) to (((4))), wherein a difference (tan $\delta_p$— tan $\delta_{22}$) between the peak value (tan $\delta_p$) of the loss tangent and the loss tangent (tan $\delta_{22}$) at 22° C. is 0 or more and 0.17 or less.

TABLE 1

| | Intermediate transfer belt | | Cleaning blade | | | | | | | |
|---|---|---|---|---|---|---|---|---|---|---|
| | | | | Characteristics of contact portion | | | | | | |
| | Type | Constituent material | Type | Constituent material | Martens hardness (N/mm$^2$) | Peak value of loss tangent (tan$\delta_p$) | Loss tangent at 22° C. (tan$\delta_{22}$) | (tan$\delta_p$ − tan$\delta_{22}$) | Coefficient D of dynamic friction | Cleanliness maintainability |
| Example 1 | 1 | PI | 1 | PU | 2.40 | 0.33 | 0.26 | 0.07 | 0.55 | A |
| Example 2 | 1 | PI | 2 | PU | 2.55 | 0.25 | 0.21 | 0.04 | 0.47 | B |
| Example 3 | 1 | PI | 3 | PU | 2.20 | 0.40 | 0.33 | 0.07 | 0.68 | B |
| Example 4 | 1 | PI | 4 | PU | 2.28 | 0.38 | 0.20 | 0.18 | 0.58 | B |
| Example 5 | 1 | PI | 5 | PU | 2.51 | 0.29 | 0.28 | 0.01 | 0.52 | A |
| Example 6 | 1 | PI | 6 | PU | 2.39 | 0.33 | 0.28 | 0.05 | 0.79 | B |
| Example 7 | 1 | PI | 7 | PU | 2.42 | 0.32 | 0.28 | 0.04 | 0.30 | B |
| Comparative Example 1 | 1 | PI | A1 | PU | 3.20 | 0.20 | 0.17 | 0.03 | 0.47 | D |
| Comparative Example 2 | 1 | PI | A2 | PU | 0.80 | 0.55 | 0.23 | 0.32 | 0.64 | D |
| Comparative Example 3 | 1 | PI | A3 | PU | 3.05 | 0.23 | 0.20 | 0.03 | 0.46 | D |

The above results tell that the present examples have higher cleanliness maintainability compared to comparative examples.

The present exemplary embodiment includes the following aspects.

(((1)))

An intermediate transfer belt cleaning system comprising:

an intermediate transfer belt that has an outer peripheral surface to which a toner image is to be transferred; and a cleaning device having a cleaning blade that comes into contact with the outer peripheral surface of the intermediate transfer belt to clean the outer peripheral surface, wherein the cleaning blade has a peak value (tan $\delta_p$) of a loss tangent of 0.25 or more and 0.40 or less at a frequency of 1 Hz and a loss tangent (tan $\delta_{22}$) of 0.20 or more and 0.35 or less at 22° C. at a frequency of 1 Hz, the tan $\delta_p$ and the tan $\delta_{22}$ being determined by measuring temperature dependence of viscoelasticity of the cleaning blade, and a coefficient D of dynamic friction between the intermediate transfer belt and the cleaning blade is 0.30 or more and 0.80 or less.

(((2)))

The intermediate transfer belt cleaning system according to (((1))), wherein the peak value (tan $\delta_p$) of the loss tangent is 0.26 or more and 0.38 or less.

(((6)))

The intermediate transfer belt cleaning system according to (((5))), wherein the difference (tan $\delta_p$— tan $\delta_{22}$) is 0 or more and 0.15 or less.

(((7)))

The intermediate transfer belt cleaning system according to any one of (((1))) to (((6))), wherein a contact portion of the cleaning blade coming into contact with the intermediate transfer belt is configured with a polyurethane rubber member having a Martens hardness of 1.0 N/mm$^2$ or more and 3.5 N/mm$^2$ or less.

(((8)))

The intermediate transfer belt cleaning system according to (((7))), wherein the Martens hardness is 1.5 N/mm$^2$ or more and 3.0 N/mm$^2$ or less.

(((9)))

A transfer device comprising:

the intermediate transfer belt cleaning system according to any one of (((1))) to (((8)));

a primary transfer device that has a primary transfer member performing primary transfer of a toner image formed on a surface of an image holder to the outer peripheral surface of the intermediate transfer belt; and a secondary transfer device that has a secondary transfer member performing secondary transfer of the toner image transferred to the outer peripheral surface of the intermediate transfer belt by the primary transfer to a surface of a recording medium.

(((10)))

An image forming apparatus comprising:

a toner image forming device that has an image holder and forms a toner image on a surface of the image holder; and the transfer device according to (((9))) that is a transfer device transferring the toner image formed on the surface of the image holder to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An intermediate transfer belt cleaning system comprising:

an intermediate transfer belt that has an outer peripheral surface to which a toner image is to be transferred; and a cleaning device having a cleaning blade that comes into contact with the outer peripheral surface of the intermediate transfer belt to clean the outer peripheral surface, wherein the cleaning blade has a peak value (tan $\delta_p$) of a loss tangent of 0.25 or more and 0.40 or less at a frequency of 1 Hz and a loss tangent (tan $\delta_{22}$) of 0.20 or more and 0.35 or less at 22° C. at a frequency of 1 Hz, the tan $\delta_p$ and the tan $\delta_{22}$ being determined by measuring temperature dependence of viscoelasticity of the cleaning blade, and a coefficient D of dynamic friction between the intermediate transfer belt and the cleaning blade is 0.30 or more and 0.80 or less.

2. The intermediate transfer belt cleaning system according to claim 1, wherein the peak value (tan $\delta_p$) of the loss tangent is 0.26 or more and 0.38 or less.

3. The intermediate transfer belt cleaning system according to claim 1, wherein the loss tangent (tan $\delta_{22}$) at 22° C. is 0.21 or more and 0.34 or less.

4. The intermediate transfer belt cleaning system according to claim 1, wherein the coefficient D of dynamic friction is 0.35 or more and 0.75 or less.

5. The intermediate transfer belt cleaning system according to claim 1, wherein a difference (tan $\delta_p$−tan $\delta_{22}$) between the peak value (tan $\delta_p$) of the loss tangent and the loss tangent (tan $\delta_{22}$) at 22° C. is 0 or more and 0.17 or less.

6. The intermediate transfer belt cleaning system according to claim 5, wherein the difference (tan $\delta_p$−tan $\delta_{22}$) is 0 or more and 0.15 or less.

7. The intermediate transfer belt cleaning system according to claim 1, wherein a contact portion of the cleaning blade coming into contact with the intermediate transfer belt is configured with a polyurethane rubber member having a Martens hardness of 1.0 $N/mm^2$ or more and 3.5 $N/mm^2$ or less.

8. The intermediate transfer belt cleaning system according to claim 7, wherein the Martens hardness is 1.5 $N/mm^2$ or more and 3.0 $N/mm^2$ or less.

9. A transfer device comprising:

the intermediate transfer belt cleaning system according to claim 1;

a primary transfer device that has a primary transfer member performing primary transfer of a toner image formed on a surface of an image holder to the outer peripheral surface of the intermediate transfer belt; and a secondary transfer device that has a secondary transfer member performing secondary transfer of the toner image transferred to the outer peripheral surface of the intermediate transfer belt by the primary transfer to a surface of a recording medium.

10. An image forming apparatus comprising:

a toner image forming device that has an image holder and forms a toner image on a surface of the image holder; and the transfer device according to claim 9 that is a transfer device transferring the toner image formed on the surface of the image holder to a surface of a recording medium.

* * * * *